United States Patent
Hashimoto et al.

(10) Patent No.: US 10,744,882 B2
(45) Date of Patent: Aug. 18, 2020

(54) ELECTRIC POWER TRANSMISSION APPARATUS AND ELECTRIC POWER TRANSMISSION SYSTEM

(71) Applicant: Toyota Jidosha Kabushiki Kaisha, Toyota-shi, Aichi-ken (JP)

(72) Inventors: Toshiya Hashimoto, Miyoshi (JP); Takahiro Misawa, Okazaki (JP); Hideo Nagata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 220 days.

(21) Appl. No.: 16/030,254

(22) Filed: Jul. 9, 2018

(65) Prior Publication Data
US 2019/0016228 A1 Jan. 17, 2019

(30) Foreign Application Priority Data
Jul. 13, 2017 (JP) .................. 2017-137162

(51) Int. Cl.
| | |
|---|---|
| *G06K 9/00* | (2006.01) |
| *B60L 11/18* | (2006.01) |
| *H02J 50/12* | (2016.01) |
| *H02J 50/60* | (2016.01) |
| *H02J 50/80* | (2016.01) |

(Continued)

(52) U.S. Cl.
CPC .......... *B60L 11/1835* (2013.01); *B60L 53/12* (2019.02); *B60L 53/124* (2019.02); *B60L 53/36* (2019.02); *B60L 53/37* (2019.02); *B60L 53/38* (2019.02); *H02J 7/025* (2013.01); *H02J 50/12* (2016.02);

(Continued)

(58) Field of Classification Search
CPC ...... B60L 11/1835; B60L 53/12; B60L 53/36; B60L 53/37; B60L 53/124; B60L 53/38; H02J 50/80; H02J 50/90; H02J 50/12; H02J 50/60; H02J 7/025
See application file for complete search history.

(56) References Cited

U.S. PATENT DOCUMENTS

| | | | |
|---|---|---|---|
| 7,741,734 B2 | 6/2010 | Joannopoulos et al. | |
| 9,180,782 B2 * | 11/2015 | Nakamura | H02J 50/90 |

(Continued)

FOREIGN PATENT DOCUMENTS

| | | |
|---|---|---|
| AU | 2006269374 B2 | 10/2009 |
| AU | 2007349874 A2 | 1/2010 |

(Continued)

*Primary Examiner* — Shefali D Goradia
(74) *Attorney, Agent, or Firm* — Dinsmore & Shohl LLP

(57) ABSTRACT

A control unit of an electric power transmission apparatus is configured to perform alignment processing in which an electric power transmission unit and an electric power reception unit are aligned with each other and foreign matter sensing processing for sensing whether or not a foreign matter is present between the electric power transmission unit and the electric power reception unit, by using an image shot by a camera. The control unit selects an alignment prioritized mode in which alignment processing is performed in preference to foreign matter sensing processing before start of electric power transmission, and selects a foreign matter sensing prioritized mode in which foreign matter sensing processing is performed in preference to alignment processing during electric power transmission.

7 Claims, 9 Drawing Sheets

(51) Int. Cl.
  *H02J 7/02*      (2016.01)
  *H02J 50/90*     (2016.01)
  *B60L 53/37*     (2019.01)
  *B60L 53/36*     (2019.01)
  *B60L 53/12*     (2019.01)
  *B60L 53/38*     (2019.01)
  *B60L 53/124*    (2019.01)

(52) U.S. Cl.
  CPC ............. *H02J 50/60* (2016.02); *H02J 50/80* (2016.02); *H02J 50/90* (2016.02)

(56) References Cited

U.S. PATENT DOCUMENTS

| | | | |
|---|---|---|---|
| 9,522,605 | B2* | 12/2016 | Taniguchi ............... B60L 53/39 |
| 9,701,213 | B2* | 7/2017 | Reddy .................. B60L 53/305 |
| 10,336,296 | B2* | 7/2019 | Hidaka .................... H02J 7/00 |
| 10,523,060 | B2* | 12/2019 | Wu ........................ H02J 50/20 |
| 2007/0222542 | A1 | 9/2007 | Joannopoulos et al. |
| 2007/0247767 | A1* | 10/2007 | Zhang .................. H02H 1/0015 361/42 |
| 2008/0278264 | A1 | 11/2008 | Karalis et al. |
| 2009/0195332 | A1 | 8/2009 | Joannopoulos et al. |
| 2009/0195333 | A1 | 8/2009 | Joannopoulos et al. |
| 2009/0224856 | A1 | 9/2009 | Karalis et al. |
| 2009/0267709 | A1 | 10/2009 | Joannopoulos et al. |
| 2009/0267710 | A1 | 10/2009 | Joannopoulos et al. |
| 2010/0096934 | A1 | 4/2010 | Joannopoulos et al. |
| 2010/0102639 | A1 | 4/2010 | Joannopoulos et al. |
| 2010/0102640 | A1 | 4/2010 | Joannopoulos et al. |
| 2010/0102641 | A1 | 4/2010 | Joannopoulos et al. |
| 2010/0117455 | A1 | 5/2010 | Joannopoulos et al. |
| 2010/0117456 | A1 | 5/2010 | Karalis et al. |
| 2010/0123353 | A1 | 5/2010 | Joannopoulos et al. |
| 2010/0123354 | A1 | 5/2010 | Joannopoulos et al. |
| 2010/0123355 | A1 | 5/2010 | Joannopoulos et al. |
| 2010/0127573 | A1 | 5/2010 | Joannopoulos et al. |
| 2010/0127574 | A1 | 5/2010 | Joannopoulos et al. |
| 2010/0127575 | A1 | 5/2010 | Joannopoulos et al. |
| 2010/0133918 | A1 | 6/2010 | Joannopoulos et al. |
| 2010/0133919 | A1 | 6/2010 | Joannopoulos et al. |
| 2010/0133920 | A1 | 6/2010 | Joannopoulos et al. |
| 2010/0171370 | A1 | 7/2010 | Karalis et al. |
| 2010/0181844 | A1 | 7/2010 | Karalis et al. |
| 2010/0187911 | A1 | 7/2010 | Joannopoulos et al. |
| 2010/0201205 | A1 | 8/2010 | Karalis et al. |
| 2010/0207458 | A1 | 8/2010 | Joannopoulos et al. |
| 2010/0225175 | A1 | 9/2010 | Karalis et al. |
| 2010/0231053 | A1 | 9/2010 | Karalis et al. |
| 2010/0237706 | A1 | 9/2010 | Karalis et al. |
| 2010/0237707 | A1 | 9/2010 | Karalis et al. |
| 2010/0237708 | A1 | 9/2010 | Karalis et al. |
| 2010/0253152 | A1 | 10/2010 | Karalis et al. |
| 2010/0264745 | A1 | 10/2010 | Karalis et al. |
| 2013/0127409 | A1 | 5/2013 | Ichikawa |
| 2013/0193749 | A1 | 8/2013 | Nakamura et al. |
| 2015/0008877 | A1 | 1/2015 | Ichikawa et al. |
| 2015/0202971 | A1* | 7/2015 | Taniguchi ............. B60L 11/182 320/108 |
| 2017/0001532 | A1* | 1/2017 | Taniguchi ........... B60L 11/1831 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| EP | 1902505 A2 | 3/2008 |
| EP | 2130287 A1 | 12/2009 |
| EP | 2985870 A1 | 2/2016 |
| IN | 735/DELNP/2008 | 5/2008 |
| IN | 6195/DELNP/2009 | 7/2010 |
| JP | 2009-501510 A | 1/2009 |
| JP | 2013-27116 A | 2/2013 |
| JP | 2013-110822 A | 6/2013 |
| JP | 2013-126327 A | 6/2013 |
| JP | 2013-146148 A | 7/2013 |
| JP | 2013146154 A | 7/2013 |
| JP | 2013154815 A | 8/2013 |
| KR | 20080031398 A | 4/2008 |
| KR | 20100015954 A | 2/2010 |
| WO | 2007008646 A2 | 1/2007 |
| WO | 2008118178 A1 | 10/2008 |

\* cited by examiner

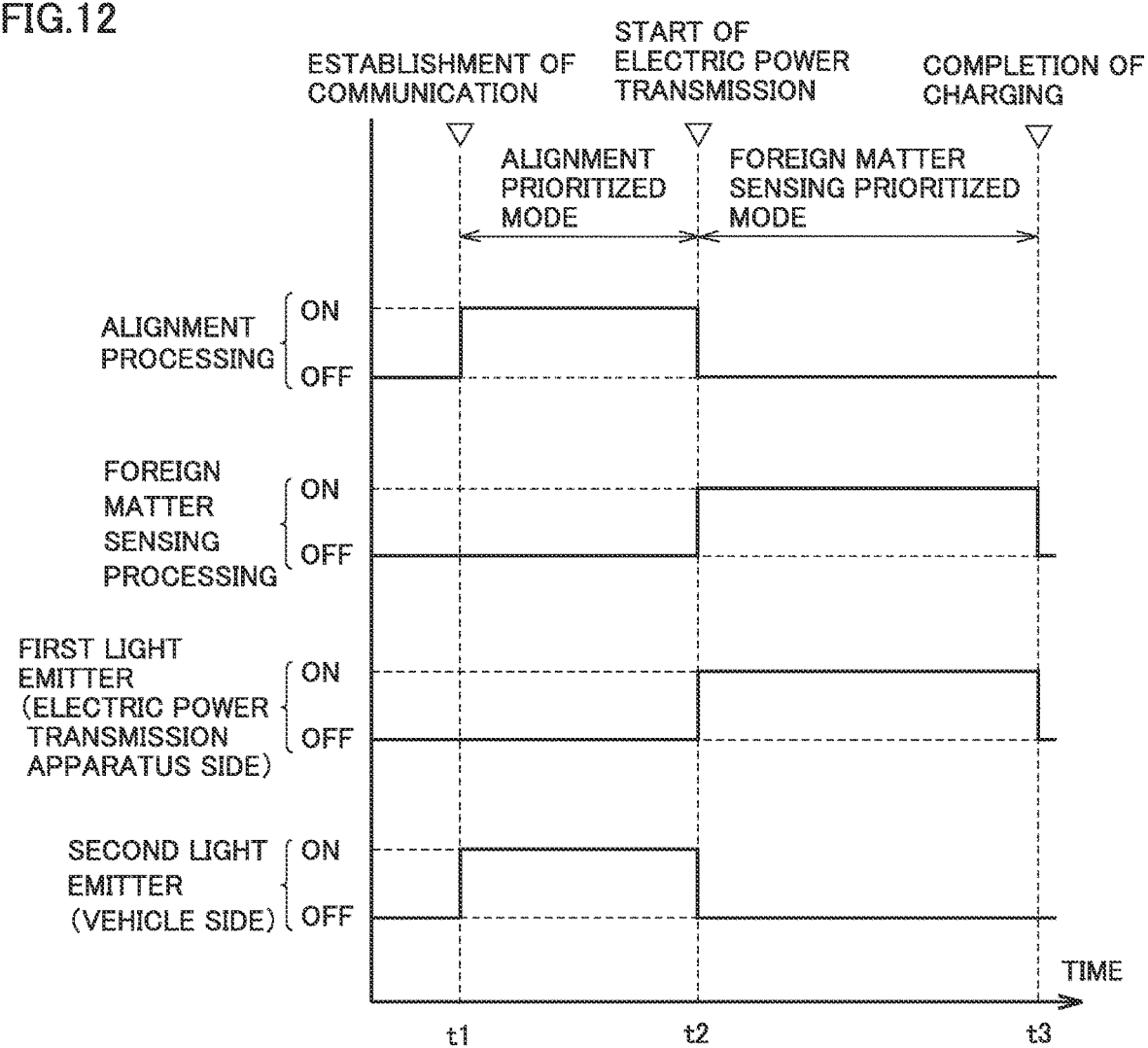

ELECTRIC POWER TRANSMISSION APPARATUS AND ELECTRIC POWER TRANSMISSION SYSTEM

CROSS-REFERENCE TO RELATED APPLICATIONS

This nonprovisional application claims priority to Japanese Patent Application No. 2017-137162 filed with the Japan Patent Office on Jul. 13, 2017, the entire contents of which are hereby incorporated by reference.

BACKGROUND

Field

The present disclosure relates to an electric power transmission apparatus and an electric power transmission system and particularly to an electric power transmission apparatus which wirelessly transmits electric power to an electric power reception apparatus and an electric power transmission system including the same.

Description of the Background Art

An electric power transmission system in which electric power is wirelessly transmitted from an electric power transmission apparatus to an electric power reception apparatus has been known. Japanese Patent Laying-Open No. 2013-27116 discloses a technique to detect a foreign matter present on a power feed surface of a power feed apparatus (electric power transmission apparatus) in such an electric power transmission system. The power feed apparatus includes a light guide portion which guides from a power feed surface, light emitted to the power feed surface of the power feed apparatus from a light projection portion provided on a bottom surface of a vehicle. A foreign matter present on the power feed surface is detected by detecting brightness of light guided from the light guide portion with a foreign matter detection portion (see Japanese Patent Laying-Open No. 2013-27116).

A shooting apparatus (camera) which can shoot surroundings of an electric power transmission portion may be provided in an electric power transmission apparatus, a foreign matter present between the electric power transmission apparatus and an electric power reception apparatus may be detected by using the shooting apparatus, and the electric power transmission portion and an electric power reception portion of the electric power reception apparatus may be aligned with each other by detecting the electric power reception apparatus.

When a vehicle is not located above an electric power transmission apparatus, for example, before completion of alignment, however, a shooting apparatus is unable to detect brightness of light depending on presence of a foreign matter under the influence by sunlight, and accuracy in sensing of a foreign matter may be lowered. When sensing of a foreign matter is simultaneously performed during alignment in which a vehicle approaches the electric power transmission apparatus, processing load imposed on a controller which performs alignment, processing and foreign matter sensing processing increases, which may lead to lowering in processing speed, extension of time for alignment and lowering in accuracy in alignment.

SUMMARY

The present disclosure was made to solve such problems, and an object thereof is to appropriately sense a foreign matter and achieve alignment of an electric power transmission portion and an electric power reception portion with each other in accordance with a condition in an electric power transmission apparatus which performs sensing of a foreign matter and alignment by using a shooting apparatus and in an electric power transmission system including the same.

An electric power transmission apparatus in the present disclosure includes an electric power transmission portion, a shooting apparatus, and a controller. The electric power transmission portion is configured to wirelessly transmit electric power to an electric power reception portion of an electric power reception apparatus. The shooting apparatus is configured to shoot surroundings of the electric power transmission portion. The controller is configured to perform alignment processing in which the electric power transmission portion and the electric power reception portion are aligned with each other and foreign matter sensing processing for sensing whether or not a foreign matter is present between the electric power transmission portion and the electric power reception portion, by using an image shot by the shooting apparatus. The controller is configured to (i) select an alignment prioritized mode in which the alignment processing is performed in preference to the foreign matter sensing processing before start of electric power transmission from the electric power transmission portion to the electric power reception portion, and (ii) select a foreign matter sensing prioritized mode in which the foreign matter sensing, processing is performed in preference to the alignment processing during electric power transmission from the electric power transmission portion to the electric power reception portion.

For example, in the alignment prioritized mode, the alignment processing and the foreign matter sensing processing are performed such that the number of times of the alignment processing performed within a prescribed time period is greater than the number of times of the foreign matter sensing processing performed within the prescribed time period. In the foreign matter sensing prioritized mode, the alignment processing and the foreign matter sensing processing are performed such that the number of times of the foreign matter sensing processing performed within a prescribed time period is greater than the number of times of the alignment processing performed within the prescribed time period.

Alternatively, in the alignment prioritized mode, the alignment processing and the foreign matter sensing processing are performed such that a time period of the alignment processing performed within a prescribed time period is longer than a time period of the foreign matter sensing processing performed within the prescribed time period. In the foreign matter sensing prioritized mode, the alignment processing and the foreign matter sensing processing are performed such that a time period of the foreign matter sensing processing performed within a prescribed time period is longer than a time period of the alignment processing performed within the prescribed time period.

In the electric power transmission apparatus and the electric power transmission system including the same, before start of electric power transmission from the electric power transmission portion to the electric power reception portion, the alignment processing is performed in preference to the foreign matter sensing processing. Thus, interference with the alignment processing by the foreign matter sensing processing during alignment before start or electric power transmission from the electric power transmission portion to the electric power reception portion can be suppressed and alignment can promptly be completed. Furthermore, accuracy in sensing of a foreign matter may be lowered as described above during alignment before start of electric power transmission from the electric power transmission portion to the electric power reception portion, and positive sensing of a foreign matter at this timing, is also suppressed. During electric power transmission from the electric power transmission portion to the electric power reception portion after completion of alignment, the foreign matter sensing processing is performed in preference to the alignment processing (position checking). Thus, interference with the foreign matter sensing processing by the alignment processing during electric power transmission can be suppressed and adverse influence on the apparatus due to overheating of a foreign matter during electric power transmission can be suppressed. According to the electric power transmission apparatus and the electric power transmission system including the same in the present disclosure, sensing of a foreign matter and alignment can thus appropriately be performed in accordance with a condition.

The electric power reception apparatus may be mounted on a vehicle and the controller may select the alignment prioritized mode during movement of the vehicle before start of electric power transmission from the electric power transmission portion to the electric power reception portion.

The electric power transmission apparatus may further include a communication apparatus which communicates with the vehicle, and the controller may select the alignment prioritized mode when communication with the vehicle is established by the communication apparatus before start of electric power transmission from the electric power transmission portion to the electric power reception portion.

According to such a configuration, undue restriction of sensing of a foreign matter can be suppressed before start of electric power transmission from the electric power transmission portion to the electric power reception portion.

In the foreign matter sensing prioritized mode, the controller may alternately perform the foreign matter sensing processing and the alignment processing with the foreign matter sensing processing being performed in preference to the alignment processing.

According to such a configuration, alignment processing (position checking) can be performed also during electric power transmission while influence on foreign matter sensing processing during electric power transmission is suppressed.

The foregoing and other objects, features, aspects and advantages of the present disclosure will become m ore apparent from the following detailed description of the present disclosure when taken in conjunction with the accompanying drawings.

BRIEF DESCRIPTION OF THE DRAWINGS

FIG. 12 is a timing chart illustrating timing to turn on/off a light emitter on a side of the electric power transmission apparatus and a light emitter on a side of the electric power reception apparatus.

DESCRIPTION OF THE EMBODIMENTS

Figure 1:
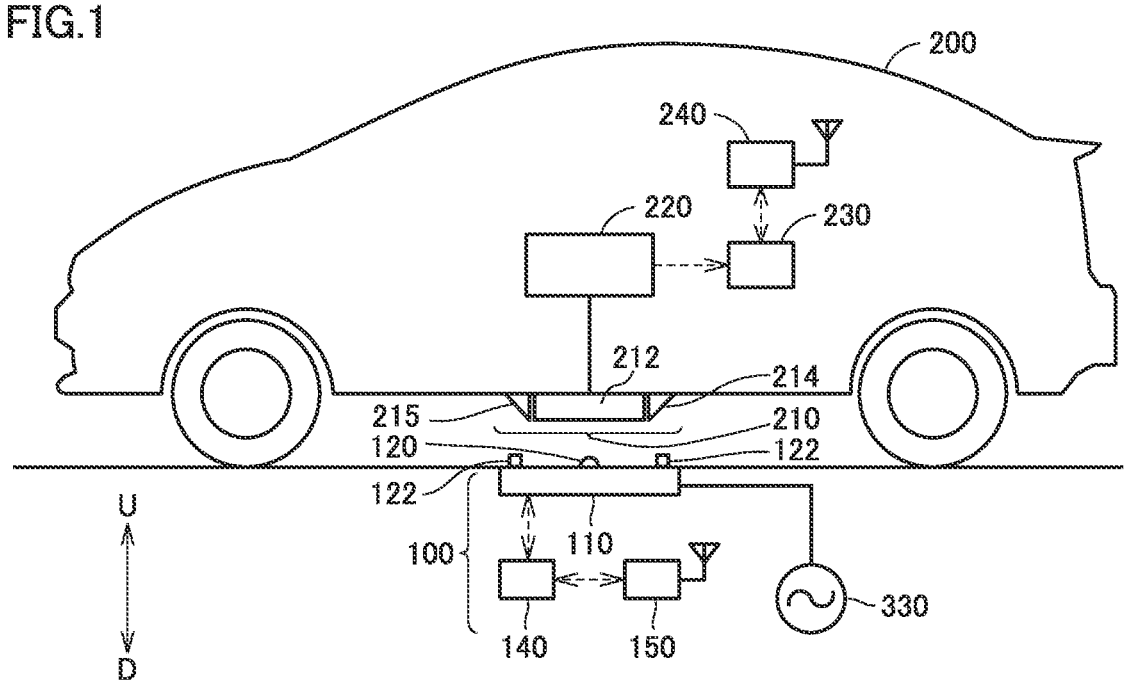
FIG. 1 is an overall configuration diagram of an electric power transmission system including an electric power transmission apparatus according to a first embodiment of the present disclosure.

An embodiment of the present disclosure will be described in detail below with reference to the drawings. The same or corresponding elements in the drawings have the same reference characters allotted and description thereof will not be repeated.

First Embodiment

FIG. 1 is an overall configuration diagram of an electric power transmission system including an electric power transmission apparatus according to a first embodiment of the present disclosure. In the drawings, an arrow D represents a vertically downward direction and an arrow U represents a vertically upward direction. Referring to FIG. 1, the electric power transmission system includes an electric power transmission apparatus 100 and a vehicle 200. Electric power transmission apparatus 100 includes an electric power transmission unit 110, a control unit 140, and a communication apparatus 150. Vehicle 200 includes an electric power reception apparatus 210, a power storage apparatus 220, a vehicle electronic control unit (ECU) 230, and a communication apparatus 240.

Electric power transmission unit 110 includes a not-shown electric power transmission coil, a camera 120, and a light emitter 122. Electric power transmission unit 110 receives supply of electric power from an alternating-current (AC) power supply 330 (for example, a commercial system power supply). Electric power transmission unit 110 is configured to wirelessly transmit electric power to electric power reception unit 212 through magnetic field while vehicle 200 is positioned such that electric power reception unit 212 (which will be described later) of vehicle 200 is opposed to electric power transmission unit 110.

Camera 120 serves as a sensor which senses a foreign matter present between electric power transmission unit 110 and electric power reception unit 212, and serves as a sensor for alignment of electric power transmission unit 110 and electric power reception unit 212 with each other. The foreign matter refers to a substance which should not be present between electric power transmission unit 110 and electric power reception unit 212, and is represented by a metal piece such as a beverage can and money, or animals. Camera 120 can also be used to sense not only a foreign matter present between electric power transmission unit 110 and electric power reception unit 212 but also an intruding object present around electric power transmission unit 110.

Camera 120 includes a fish-eye lens and is provided substantially in a central portion of an upper surface of electric power transmission unit 110. With the fish-eye lens, camera 120 is configured to be able to shoot a space between electric power transmission unit 110 and electric power reception unit 212 and a large space including electric power reception apparatus 210 when vehicle 200 approaches electric power transmission apparatus 100. A foreign matter between electric power transmission unit 110 and electric power reception unit 212 (and further an intruding object around electric power transmission unit 110) can be sensed by using an image shot by such a camera 120. Furthermore, relative positional relation between camera 120 and electric power reception unit 212 can be calculated based on the image shot by camera 120 so that electric power transmission unit 110 and electric power reception unit 212 can be aligned with each other based on calculated relative positional relation.

Light emitter 122 is a light source controlled to be turned on/off by control unit 140 and provided on electric power transmission unit 110. In the first embodiment, light emitter 122 is provided in a form of a frame around an outer perimeter of electric power transmission unit 110 on the upper surface of electric power transmission unit 110. Light emitter 122 is implemented, for example, by a light emitting diode (LED), and it emits light such that camera 120 can shoot light emitted therefrom. Light emitter 122 is tamed on while foreign matter sensing processing is being performed. In the first embodiment, light emitter 122 is turned on also while electric power transmission unit 110 and electric power reception unit 212 are being aligned with each other such that camera 120 can sense a marker (which will be described later) provided in electric power reception apparatus 210.

Control unit 140 includes a central processing, unit (CPU), a memory (a read only memory (ROM) and a random access memory (RAM)), and an input and output port for input and output of various signals (none of which are shown). Control unit 140 controls electric power transmission to electric power reception unit 212 by electric power transmission unit 110 based on information stored in the memory or information from various sensors. Control unit 140 performs alignment processing for alignment of electric power transmission unit 110 and electric power reception unit 212 with each other and foreign matter sensing processing, by using an image shot by camera 120. Various types of processing performed by control unit 140 are not limited to processing by software and can also be performed by dedicated hardware (an electronic circuit).

Communication apparatus 150 is an apparatus for wireless communication with vehicle 200 and configured to be able to bidirectionally communicate with communication apparatus 240 provided in vehicle 200.

In vehicle 200, electric power reception apparatus 210 includes electric power reception unit 212 and protective members 214 and 215. Electric power reception unit 212 includes a not-shown electric power reception coil and is configured to wirelessly receive electric power through magnetic field from electric power transmission unit 110 while vehicle 200 is positioned such that electric power reception Unit 212 is opposed to electric power transmission unit 110 of electric power transmission apparatus 100. Protective members 214 and 215 are disposed on a vehicle rear side and a vehicle front side relative to electric power reception unit 212, respectively, and serve to protect electric power reception unit 212 against interference with a road surface.

(AC) electric power received by electric power reception unit 212 is rectified by a not-shown rectifier and stored in power storage apparatus 220. Power storage apparatus 220 is a rechargeable DC power supply and includes a secondary battery such as a lithium ion battery or a nickel-metal hydride battery. Power storage apparatus 220 stores electric power received by electric power reception unit 212. Electric power stored in power storage apparatus 220 is supplied to a not-shown traction motor and used for generation of driving force for vehicle 200. An electric double layer capacitor can also be adopted as power storage apparatus 220.

Vehicle ECU 230 includes a CPU, a memory (a ROM and a RAM), and an input and output port for input and output of various signals (none of which are shown). Vehicle ECU 230 controls running of vehicle 200 based on information stored in the memory or information from various sensors. Vehicle ECU 230 controls electric power reception from electric power transmission unit 110 by electric power reception unit 212 and charging of power storage apparatus 220 during electric power transmission from electric power transmission apparatus 100 to vehicle 200. Various types of processing performed by vehicle ECU 230 are not limited to processing by software either, and can also be performed by dedicated hardware (an electronic circuit).

Communication apparatus 240 is an apparatus for wireless communication with electric power transmission apparatus 100 and configured to be able to bidirectionally communicate with communication apparatus 150 provided in electric power transmission apparatus 100.

Figure 2:
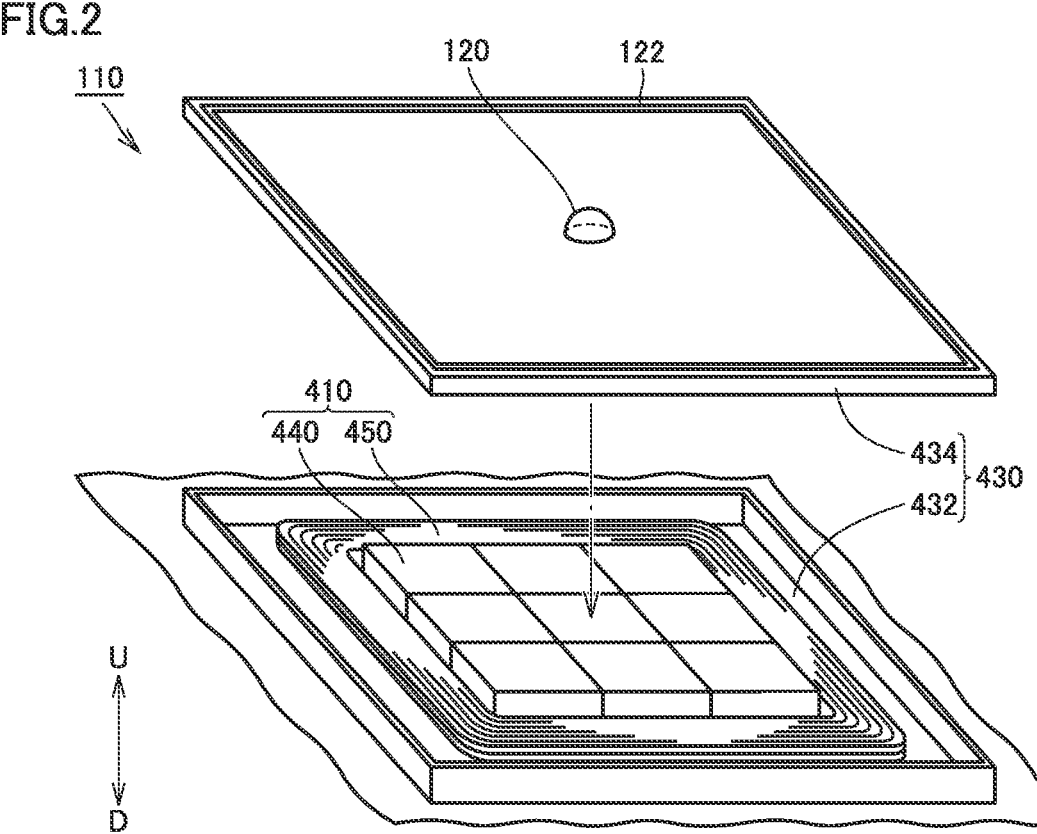
FIG. 2 is an exploded perspective view showing a configuration example of an electric power transmission unit.

FIG. 2 is an exploded perspective view showing a configuration example of electric power transmission unit 110. Referring to FIG. 2, electric power transmission unit 110 includes an electric power transmission coil 410, a housing 430, camera 120, and light emitter 122.

Electric power transmission coil 410 includes a core 440 composed of ferrite and a lead 450 wound around core 440. Wound lead 450 may be disposed on core 440. Though not particularly shown, in some embodiments, electric power transmission unit 110 is provided with a capacitor which is connected to electric power transmission coil 410 (lead 450) to form a resonant circuit together with electric power transmission coil 410, with the resonant circuit having a Q value representing resonance intensity not lower than 100. Electric power transmission coil 410 is accommodated in housing 430. Housing 430 includes a shield 432 and a lid member 434.

Camera 120 is provided substantially in a central portion of lid member 434. As described above, camera 120 includes a fish-eye lens, and is configured to be able to shoot a space above electric power transmission unit 130 and a large space around electric power transmission unit 110. Light emitter 122 is provided on an upper surface of lid member 434 in a form of a rectangular frame around an outer perimeter of lid member 434 and configured to emit light in a direction of an inner perimeter and a direction, of an outer perimeter of the frame.

An image shot by camera 120 is transmitted to not-shown control unit 140 (FIG. 1). Light emitter 122 is controlled to be turned on/off by not-shown control unit 140.

Referring again to FIG. 1, in the first embodiment, camera 120 including the fish-eye lens is provided on electric power transmission unit 110. By using an image shot by camera 120, a foreign matter between electric power transmission unit 110 and electric power reception unit 212 (and further an intruding object around electric power transmission unit 110) is detected, and electric power transmission unit 110 and electric power reception unit 212 are aligned with each other.

When vehicle 200 is not located above electric power transmission apparatus 100, for example, before completion of alignment, camera 120 is unable to detect brightness of light depending on presence of a foreign matter under the influence by sunlight, and accuracy in sensing of a foreign matter may be lowered. Furthermore, when sensing of a foreign matter is simultaneously performed during alignment in which vehicle 200 approaches electric power transmission apparatus 100, processing load imposed on control unit 140 which performs alignment processing and foreign matter sensing processing increases, which may lead to lowering in processing speed, extension of time for alignment, and lowering in accuracy in alignment.

In electric power transmission apparatus 100 according to the first embodiment, before start of electric power transmission from electric power transmission unit 110 to electric power reception unit 212, alignment processing is performed in preference to foreign matter sensing processing. Thus, interference with alignment processing by foreign matter sensing processing during alignment before start of electric power transmission from electric power transmission unit 110 to electric power reception unit 212 can be suppressed, and alignment can promptly be completed. Furthermore, accuracy in sensing of a foreign matter may be lowered as described above during alignment before start of electric power transmission from electric power transmission unit 110 to electric power reception unit 212, and positive sensing of a foreign matter at this timing is also suppressed.

In electric power transmission apparatus 100, during electric power transmission from electric power transmission unit 110 to electric power reception unit 212 after completion of alignment, foreign matter sensing processing is performed in preference to alignment processing (position checking). Thus, interference with foreign matter sensing processing by alignment processing during electric power transmission can be suppressed, and adverse influence on electric power transmission unit 110 due to overheating of a foreign, matter during electric power transmission can be suppressed. According to electric power transmission apparatus 100, sensing of a foreign matter and alignment can thus appropriately be performed in accordance with a condition.

In the first embodiment, a marker for sensing a position of electric power reception unit 212 with camera 120 is provided on a lower surface of electric power reception apparatus 210 (a surface opposed to electric power transmission apparatus 100 during electric power reception). Relative positional relation between camera 120 and electric power reception unit 212 is calculated through prescribed geometric calculation based on a position of the marker in an image shot by camera 120 so that electric power transmission unit 110 and electric power reception unit 212 are aligned with each other based on calculated relative positional relation.

Figure 3:
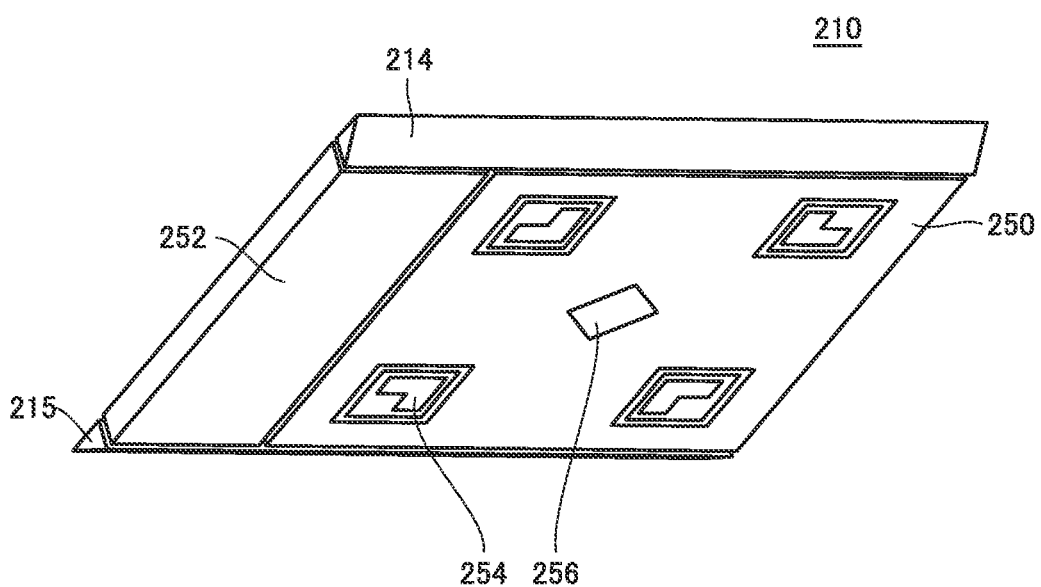
FIG. 3 is a diagram showing one example of a marker provided in an electric power reception apparatus.

FIG. 3 is a diagram showing one example of a marker provided in electric power reception apparatus 210. Referring to FIG. 3, electric power reception apparatus 210 includes a resin case 250, a metal case 252, and protective members 214 and 215. Resin case 250 accommodates an electric power reception coil (not shown) which wirelessly receives electric power from electric power transmission unit 110 (FIGS. 1 and 2). Metal case 252 accommodates electrical equipment (not shown) such as a filter circuit, and a rectifier. Protective members 214 and 215 are disposed in a direction of the vehicle front and rear relative to resin case 250 and metal case 252.

In this example, markers 254 and 256 are provided in four corners and substantially in a central portion of resin ease 250. In alignment of electric power reception unit 212 with electric power transmission unit 110, an image is picked up by camera 120 and markers 254 and 256 are detected in the picked-up image. Relative positional relation between electric power transmission unit 110 and electric power reception unit 212 (in a horizontal direction and a gap) is calculated based on sizes and positions of detected markers 254 and 256 through prescribed geometric calculation.

Figure 4:
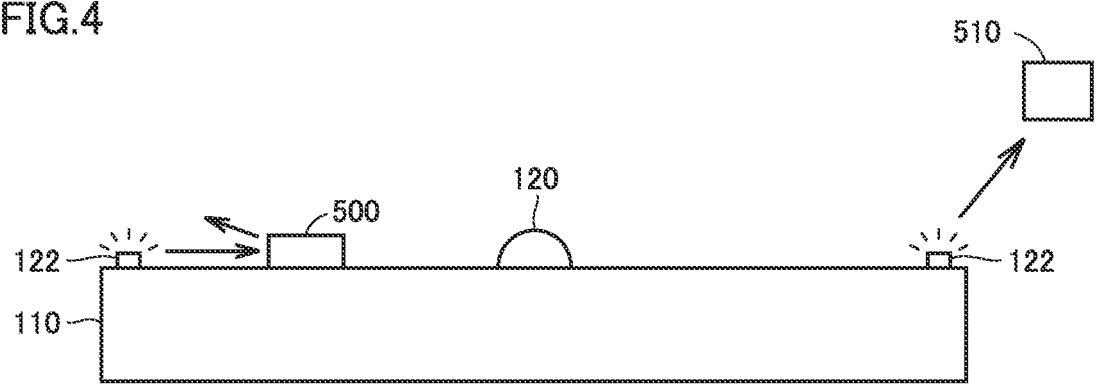
FIG. 4 is a diagram illustrating a method of sensing a foreign matter with a camera.

FIG. 4 is a diagram illustrating a method of sensing a foreign matter with camera 120. Referring to FIG. 4, during sensing of a foreign matter, control unit 140 (FIG. 1) turns on light emitter 122. When a foreign matter 500 is present on electric power transmission unit 110, some of light emitted from light emitter 122 is cut off by foreign matter 500. Therefore, there is a difference in an image shot by camera 120 between a case where no foreign matter is present on electric power transmission unit 110 and a ease where foreign matter 500 is present on electric power transmission unit 110. Whether or not foreign matter 500 is present on electric power transmission unit 110 can thus be sensed.

Electric power transmission apparatus 100 can sense also an intruding object 510 around electric power transmission unit 110. Specifically, when intruding object 510 is present around electric power transmission unit 110, light emitted from light emitter 122 is reflected by intruding object 510 and reaches camera 120. Whether or not intruding object 510 is present around electric power transmission unit 110 can thus also be sensed.

Figure 5:
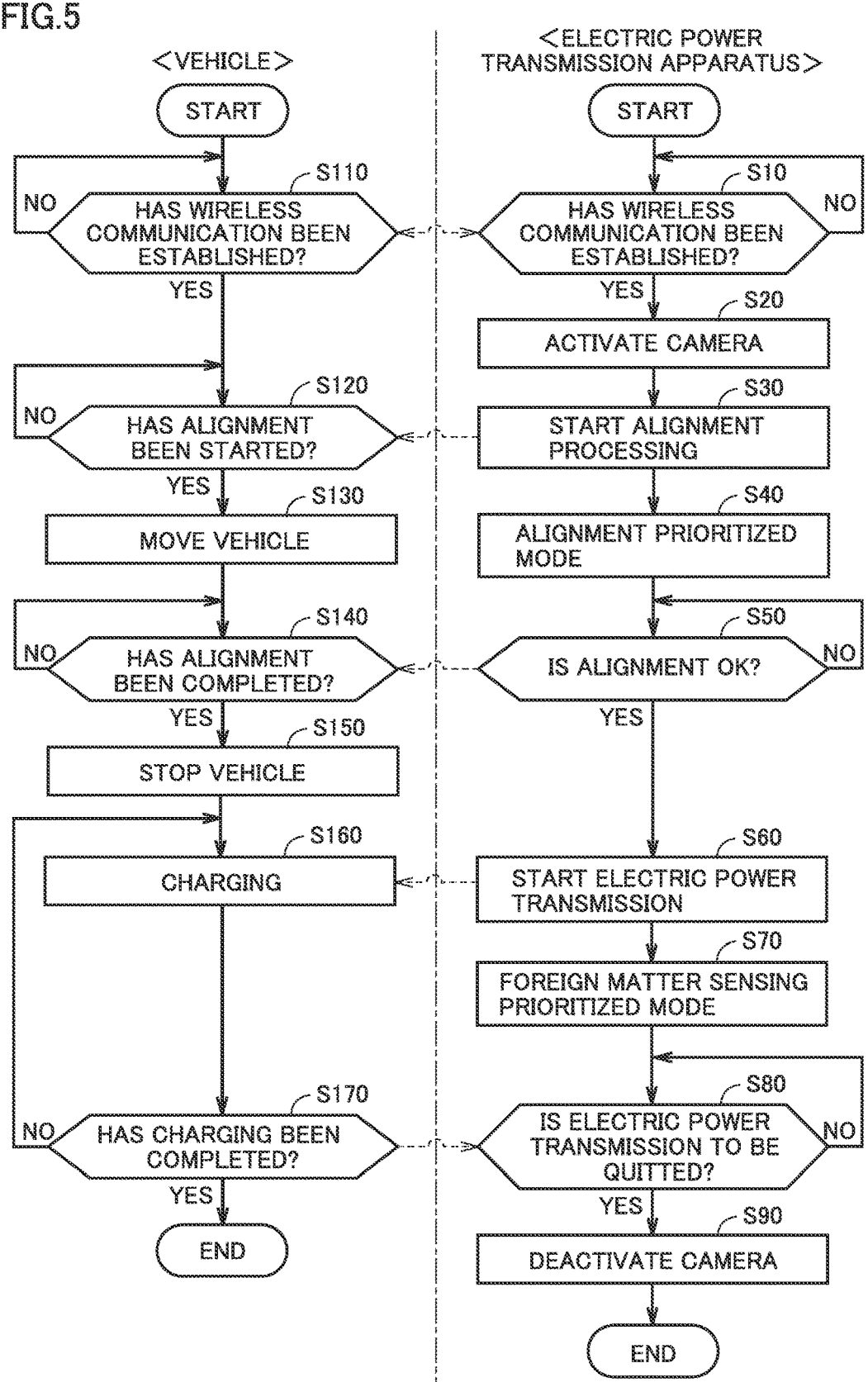
FIG. 5 is a flowchart showing, one example of a procedure of processing performed by a control unit of the electric power transmission apparatus and a vehicle ECU of a vehicle.

FIG. 5 is a flowchart showing one example of a procedure of processing performed by control unit 140 of electric power transmission apparatus 100 and vehicle ECU 230 of vehicle 200. Referring to FIG. 5, control unit 140 of electric power transmission apparatus 100 determines whether or not wireless communication by communication apparatus 150 has been established between electric power transmission apparatus 100 and vehicle 200 as vehicle 200 which desires to receive electric power from electric power transmission apparatus 100 comes closer to electric power transmission apparatus 100 (step S10).

When wireless communication with vehicle 200 is established (YES in step S10), control unit 140 activates camera 120 (step S20). Control unit 140 starts alignment processing for alignment between electric power transmission unit 110 and electric power reception unit 212 by using an image shot by camera 120 (step S30). Control unit 140 selects an "alignment prioritized mode" in which alignment processing is performed in preference to foreign matter sensing processing (step S40). In the first embodiment, control unit 140 does not perform foreign matter sensing processing in the alignment prioritized mode.

In alignment processing in step S30, control unit 140 specifically calculates relative positional relation between camera 120 and electric power reception unit 212 through prescribed geometric calculation based on positions of markers 254 and 256 of electric power reception apparatus 210 in the image shot by camera 120. Electric power transmission unit 110 and electric power reception unit 212 are aligned with each other by using calculated relative positional relation. Control unit 340 may transmit, information, on relative positional relation between electric, power transmission unit 110 and electric power reception unit 212 or the image shot by camera 120 together with the information to vehicle 200 through communication apparatus 150.

Then, control unit 140 determines whether or not alignment between electric power transmission unit 110 and electric power reception unit 212 is OK (step S50). For example, when a horizontal distance between electric power transmission unit 110 and electric power reception unit 212 is within a prescribed range, control unit 140 determines that alignment is OK.

When alignment between electric power transmission unit 110 and electric power reception unit 212 is determined as OK (YES in step S50), control unit 140 transmits a notification to the effect that alignment has been completed to vehicle 200 by means of communication apparatus 150 and starts electric power transmission from electric power transmission unit 110 to electric power reception unit 212 of vehicle 200 (step S60). Control unit 140 selects a "foreign matter sensing prioritized mode" in which foreign matter sensing processing is performed in preference to alignment processing (step S70). In the first embodiment, control unit 140 does not perform alignment processing in the foreign matter sensing prioritized mode.

Then, control unit 140 determines whether or not to quit electric power transmission from electric power transmission unit 110 (step S80). When control unit 140 receives a notification of completion of charging from vehicle 200, control unit 140 determines that electric power transmission be quitted. When it is determined in step S80 that electric power transmission be quitted (YES in step S80), control unit 140 deactivates camera 120 (step S90) and has the process proceed to end.

In vehicle 200, when wireless communication with electric power transmission apparatus 100 is established (YES in step S110), vehicle ECU 230 determines whether or not to start alignment between electric power transmission unit 110 and electric power reception unit 212 (step S120). When alignment processing is started in electric power transmission apparatus 100, vehicle ECU 230 determines that alignment be started. When alignment is started (YES in step S120), vehicle ECU 230 has vehicle 200 move toward electric power transmission apparatus 100 (step S130). Movement of vehicle 200 may be responsive to an operation by a user.

Then, vehicle ECU 230 determines whether or not alignment between electric power transmission unit 110 and electric power reception unit 212 has been completed (step S140). When vehicle ECU 230 receives a notification to the effect that alignment has been completed from electric power transmission, apparatus 100 by means of communication apparatus 240, it determines that alignment has been completed. When it is determined in step S140 that alignment has been completed (YES in step S140), vehicle ECU 230 stops vehicle 200 (step S150). Stop of vehicle 200 may be responsive to an operation by a user.

Thereafter, when electric power transmission to vehicle 200 is started in electric power transmission apparatus 100, vehicle ECU 230 has power storage apparatus 220 charged with electric power received by electric power reception unit 212 (step S160).

Then, vehicle ECU 230 determines whether or not charging of power storage apparatus 220 has been completed (step S170). Whether or not charging of power storage apparatus 220 has been completed is determined based on a state of charge (SOC) of power storage apparatus 220. When it is determined that charging of power storage apparatus 220 has been completed (YES in step S170), vehicle ECU 230 transmits a notification of completion of charging to electric power transmission apparatus 100 through communication apparatus 240 and has the process proceed to end.

Figure 6:
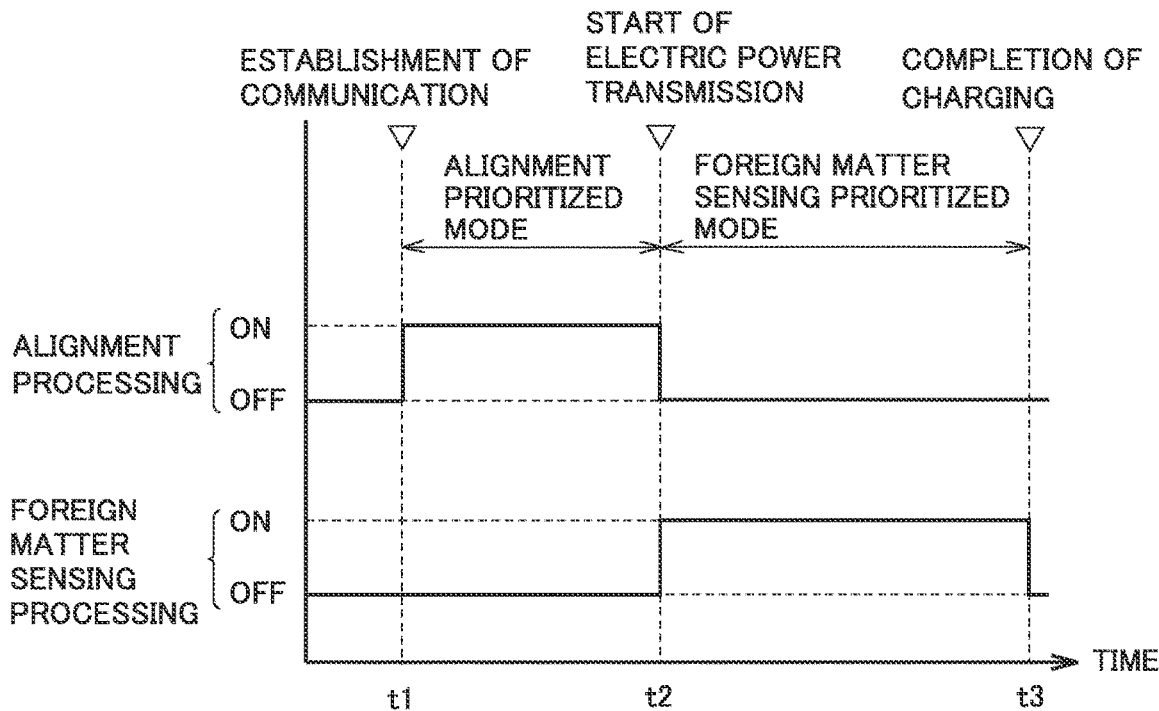
FIG. 6 is a timing chart illustrating timing to perform alignment processing and foreign matter sensing processing.

FIG. 6 is a timing chart illustrating timing to perform alignment processing and foreign matter sensing processing. Referring to FIG. 6, when communication between electric power transmission apparatus 100 and vehicle 200 is established at time t1, control unit 140 of electric power transmission apparatus 100 performs alignment processing (ON) and does not perform foreign matter sensing processing (OFF). Control unit 140 selects the alignment prioritized mode in which alignment processing is performed in preference to foreign matter sensing processing.

When alignment between electric power transmission unit 110 and electric power reception unit 212 is completed and electric power transmission from electric power transmission unit 110 to electric power reception unit 212 is started at time t2, control unit 140 performs foreign matter sensing processing (ON) and does not perform alignment processing (OFF). Control unit 140 selects the foreign matter sensing prioritized mode in which foreign matter sensing processing is performed in preference to alignment processing.

As set forth above, in the first embodiment, before start of electric power transmission from electric power transmission unit 110 to electric power reception unit 212, alignment processing is performed in preference to foreign matter sensing processing (the alignment prioritized mode). Thus, alignment between electric power transmission unit 110 and electric power reception unit 212 can promptly be completed. Accuracy in sensing of a foreign matter may be lowered during alignment before start of electric power transmission from electric power transmission unit 110 to electric power reception unit 212, and positive sensing of a foreign matter at this timing is also suppressed.

In the first embodiment during electric power transmission from electric power transmission unit 110 to electric power reception unit 212 after completion of alignment, foreign matter sensing processing is performed in preference to alignment processing (position checking) (the foreign matter sensing prioritized mode). Adverse influence on electric power transmission unit 110 by overheating of a foreign matter during electric power transmission can thus be suppressed. According to the first embodiment sensing of a foreign matter and alignment can thus appropriately be performed in accordance with a condition.

[First Modification]

Though alignment processing is not performed in the foreign matter sensing prioritized mode in the first embodiment, in the foreign matter sensing prioritized mode, foreign matter sensing processing and alignment processing may alternately be performed with foreign matter sensing processing being performed in preference to alignment processing. Alignment processing, in the foreign matter sensing prioritized mode is performed in order to confirm that vehicle 200 has not been moved after completion of alignment. In the foreign matter sensing prioritized mode, while electric power is being transmitted from electric power transmission apparatus 100 to vehicle 200, it can be confirmed that vehicle 200 has not been moved during electric power transmission by performing alignment processing in the foreign matter sensing prioritized mode. Contents of alignment processing performed in the foreign matter sensing prioritized mode is the same as contents of alignment processing performed in the alignment prioritized mode (checking of positions of electric power transmission unit 110 and electric power reception unit 212 relative to each other by using; an image obtained by camera 120).

Figure 7:
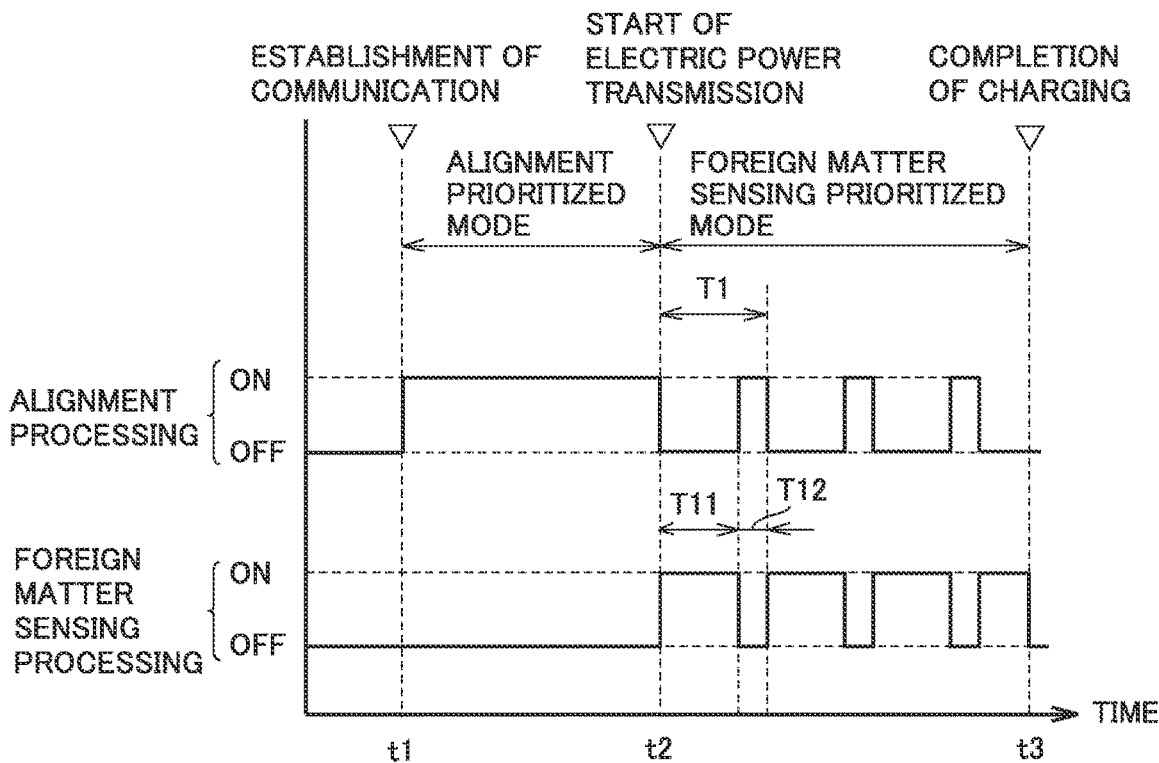
FIG. 7 is a timing chart illustrating timing to perform alignment processing and foreign matter sensing processing in a first modification.

FIG. 7 is a timing chart illustrating timing to perform alignment processing and foreign matter sensing processing in the first modification. Referring to FIG. 7, when alignment between electric power transmission unit 110 and electric power reception unit 212 is completed and electric power transmission from electric power transmission unit 110 to electric power reception unit 212 is started at time t2, control unit 140 alternately performs foreign matter sensing processing and alignment processing with foreign matter sensing processing being performed in preference to alignment processing (the foreign matter sensing prioritized mode).

Specifically, each of foreign matter sensing processing and alignment processing is performed in a prescribed control cycle, and control unit 140 performs foreign matter sensing processing and alignment processing such that the number of times of foreign matter sensing processing performed within a prescribed time period T1 is greater than the number of times of alignment processing performed (for example, foreign matter sensing, processing is performed a plurality of times within a time period T11 and thereafter alignment processing is performed once within a time period T12). Alternatively, in the foreign matter sensing prioritized mode, control unit 140 performs foreign matter sensing processing and alignment processing such that a time period of foreign matter sensing processing performed within prescribed time period T1 is longer than a time period of alignment processing performed (T11>T12).

Thus, processing for alignment (position checking) between electric power transmission unit 110 and electric power reception unit 212 can be performed also during electric power transmission while influence on foreign matter sensing processing during electric power transmission (the foreign matter sensing prioritized mode) is suppressed.

[Second Modification]

In the first embodiment and the first modification, foreign matter sensing processing is not performed in the alignment prioritized mode before start of electric power transmission. Foreign matter sensing processing, however, may be desired also before start of electric power transmission, with the understanding, that, accuracy in sensing of a foreign matter may be lowered. In a second modification, in the alignment prioritized mode before start of electric power transmission, alignment processing and foreign matter sensing processing are alternately performed with alignment processing being performed in preference to foreign matter sensing processing.

Figure 8:
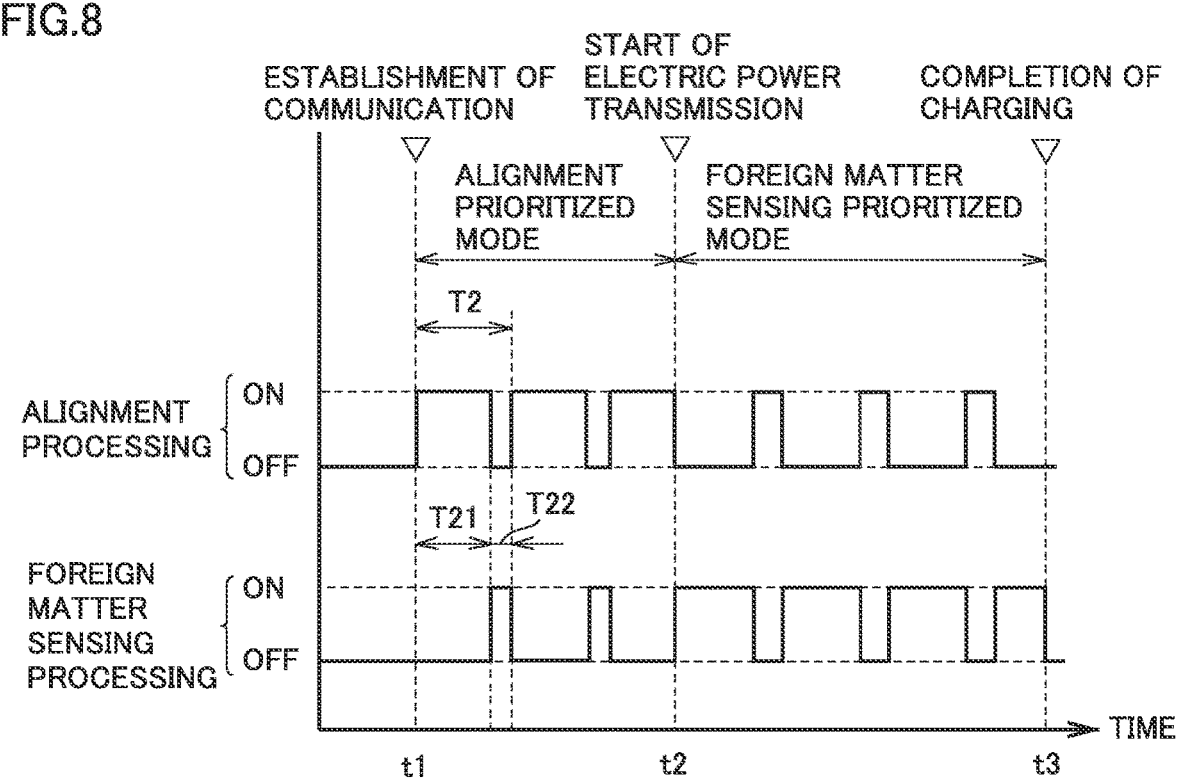
FIG. 8 is a timing chart illustrating timing to perform alignment processing and foreign matter sensing processing in a second modification.

FIG. 8 is a timing chart illustrating timing to perform alignment processing and foreign matter sensing processing in the second modification. Referring to FIG. 8, when communication between electric power transmission apparatus 100 and vehicle 200 is established at time t1, control unit 140 alternately performs alignment processing and foreign matter sensing processing with alignment processing being performed in preference to foreign matter sensing processing (the alignment prioritized mode).

Specifically, each of foreign matter sensing processing and alignment processing is performed in a prescribed control cycle and control unit 140 performs alignment processing and foreign matter sensing processing such that the number of times of alignment processing performed within a prescribed time period T2 is greater than the number of times of foreign matter sensing processing performed (for example, alignment processing is performed a plurality of times within a time period T21 and thereafter foreign matter sensing processing is performed once within a time period T22). Alternatively, in the alignment prioritized mode, control unit 140 performs alignment processing and foreign matter sensing processing such that a time period of alignment processing performed within prescribed time period T2 is longer than a time period of foreign matter sensing processing performed (T21>T22).

Foreign matter sensing processing can thus be performed also before start of electric power transmission while influence on alignment processing in the alignment prioritized mode is suppressed.

Second Embodiment

In the first embodiment, markers 254 and 256 (FIG. 3) for sensing a position of electric power reception unit 212 with camera 120 are provided on the lower surface of electric power reception apparatus 210 and relative positional relation between camera 120 and electric power reception unit 212 is sensed based on positions of markers 254 and 256 in an image shot by camera 120.

In a second embodiment, a light emitter is provided also on a side of electric power reception apparatus 210 instead of a marker and the light emitter provided in electric power reception apparatus 210 is turned on while alignment processing is performed (with light emitter 122 of electric power transmission unit 110 being turned off). By sensing the light emitter provided in electric power reception apparatus 210 with camera 120, relative positional relation between electric power transmission unit 110 and electric power reception unit 212 is calculated so that electric power transmission unit 110 and electric power reception unit 212 are aligned with each other based on calculated relative positional relation. By providing the light emitter on the side of electric power reception apparatus 210 instead of the marker, camera 120 can accurately sense a position of electric power reception unit 212.

Figure 9:
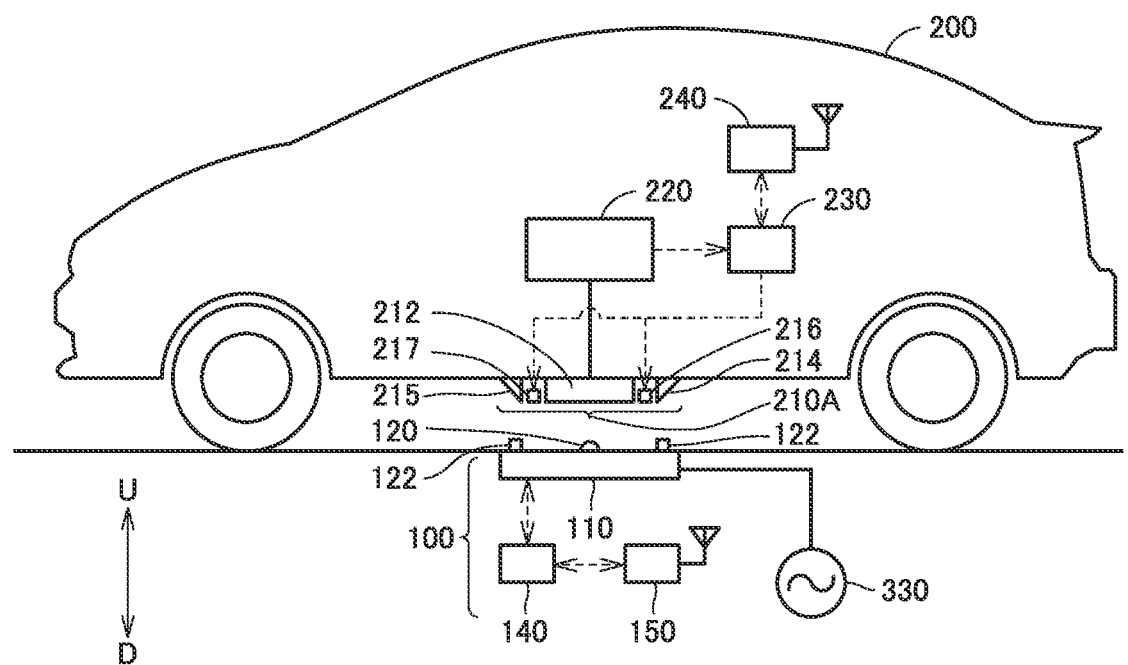
FIG. 9 is an overall configuration diagram of the electric power transmission system according to a second embodiment.

FIG. 9 is an overall configuration diagram of the electric power transmission system according to the second embodiment. Referring to FIG. 9, the second embodiment is different from the first embodiment in configuration of the electric power reception apparatus of vehicle 200. Vehicle 200 in the second embodiment includes an electric power reception apparatus 210A. Electric power reception apparatus 210A includes electric power reception unit 212, protective members 214 and 215, and light emitters 216 and 217. Since light emitters 216 and 217 are provided, markers as shown in FIG. 3 are not provided.

Light emitters 216 and 217 are light sources controlled to be turned on/off by vehicle ECU 230. In the second embodiment, light emitter 216 is disposed between electric power reception unit 212 and protective member 214, and light emitter 217 is disposed between electric power reception unit 212 and protective member 215. Light emitters 216 and 217 are implemented by LEDs, and emit light such that camera 120 of electric power transmission apparatus 100 can shoot light emitted from light emitters 216 and 217 during alignment between electric power transmission unit 110 and electric power reception unit 212.

Figure 10:
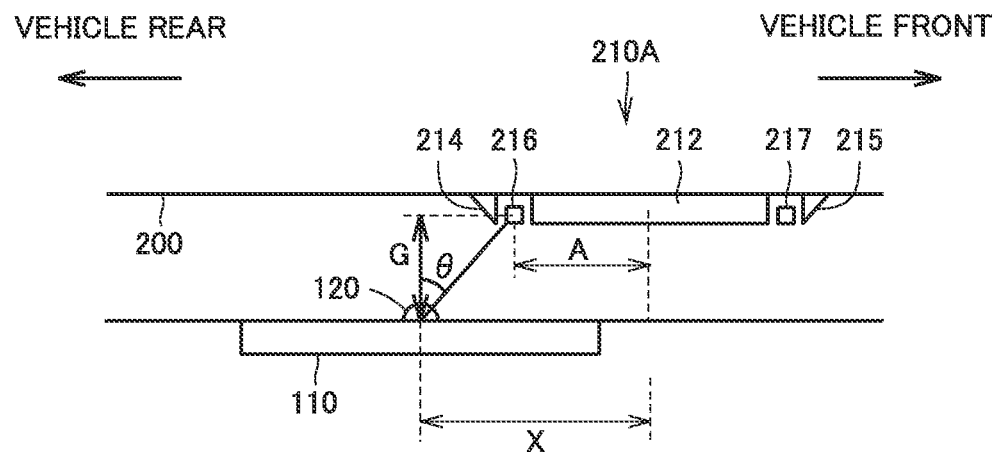
FIG. 10 is a diagram showing relative positional relation between an electric power transmission unit and an electric power reception unit in alignment between the electric power transmission unit and the electric power reception unit.

FIG. 10 is a diagram showing relative positional relation between electric power transmission unit 110 and electric power reception unit 212 in alignment between electric power transmission unit 110 and electric power reception unit 212. Referring to FIG. 10, light emitter 216 (217) on the side of electric power reception apparatus 210A emits light during alignment. A gap G between camera 120 and light emitter 216 (217) (a distance in a vertical direction between electric power transmission unit 110 and electric power reception unit 212) and a horizontal distance X between camera 120 and electric power reception unit 212 (a horizontal distance between the center of electric power transmission unit 110 and the center of electric power reception unit 212) can be calculated through prescribed geometric calculation based on a position of light emitter 216 with respect to the center of the image (the center of camera 120) in the image shot by camera 120.

Figure 11:
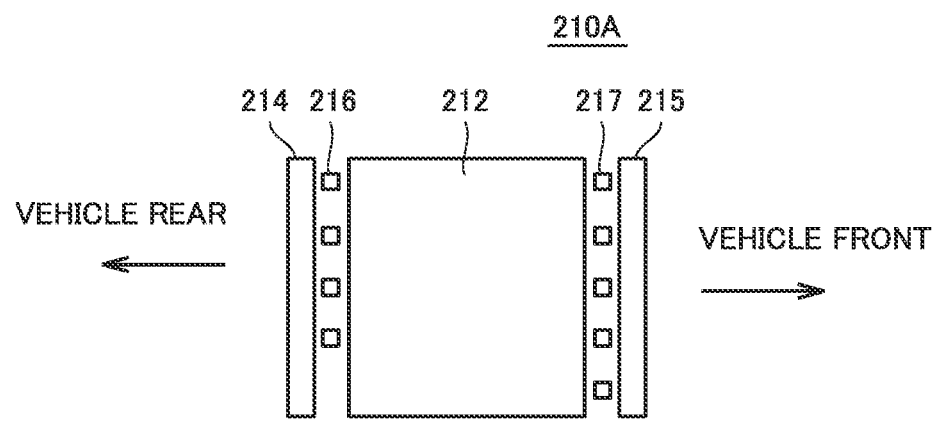
FIG. 11 is a plan view of the electric power reception apparatus.

FIG. 11 is a plan view of electric power reception apparatus 210A. Referring to FIG. 11, in the second embodiment, the number of light emitters 216 provided on a vehicle rear side relative to electric power reception unit 212 is different from the number of light emitters 217 provided on a vehicle front side. In sensing with camera 120, relative positional relation between electric power transmission unit 110 and electric power reception unit 212 during alignment, the front-rear direction of vehicle 200 can thus be recognized from a shot image.

Though only light emitters 216 provided on the vehicle rear side relative to electric power reception unit 212 are turned on while vehicle 200 moves rearward (including temporary stop during movement rearward) and only light emitters 217 provided on the vehicle front side relative to electric power reception unit 212 are turned on while vehicle 200 moves forward (including temporary stop during movement forward, light emitters 216 and 217 may be turned on regardless of a direction of movement of vehicle 200.

FIG. 12 is a timing chart illustrating timing to turn on/off light emitter 122 on the side of electric power transmission apparatus 100 and light emitters 216 and 217 on the side of electric power reception apparatus 210A. In FIG. 12, the "first light emitter" represents light emitter 122 on the side of electric power transmission apparatus 100 and the "second light emitter" represents light emitters 216 and 217 on the side of electric power reception apparatus 210A.

Referring to FIG. 12, during alignment processing, light emitter 122 (the first light emitter ) on the side of electric power transmission apparatus 100 is turned off and light emitters 216 and 217 (the second light emitter) on the side of electric power reception apparatus 210A are turned on. Electric power reception apparatus 210A can thus accurately be sensed with camera 120 during alignment processing.

During foreign matter sensing processing, light emitter 122 (the first light emitter) on the side of electric power transmission apparatus 100 is turned on. A foreign matter on electric power transmission unit 110 or an intruding object around electric power transmission unit 110 can thus be sensed. Though light emitters 216 and 217 (the second light emitter) on the side of electric power reception apparatus 210A are turned off, light emitters 216 and 217 (the second light emitter) may be turned on also during foreign matter sensing processing.

According to the second embodiment, a position of electric power reception unit 212 can accurately be detected with camera 120 by providing light emitters 216 and 217 in electric power reception apparatus 210A instead of the marker.

In the second embodiment as well, in the foreign matter sensing prioritized mode, foreign matter sensing processing and alignment processing may alternately be performed with foreign matter sensing processing being performed in preference to alignment processing as in the first modification of the first embodiment. In the alignment prioritized mode, alignment processing and foreign matter sensing processing may alternately be performed with alignment processing being performed in preference to foreign matter sensing processing as in the second modification of the first embodiment.

Though embodiments of the present disclosure have been described, it should be understood that the embodiments disclosed herein are illustrative and non-restrictive in every respect. The scope of the present disclosure is defined by the terms of the claims and is intended to include any modifications within the scope and meaning equivalent to the terms of the claims.

What is claimed is:

1. An electric power transmission apparatus comprising:
   an electric power transmission portion configured to wirelessly transmit electric power to an electric power reception portion of an electric power reception apparatus;
   a shooting apparatus configured to shoot surroundings of the electric power transmission portion; and
   a controller configured to perform alignment processing and foreign matter sensing processing by using an image shot by the shooting apparatus, the alignment processing being a process in which the electric power transmission portion and the electric power reception portion are aligned with each other, the foreign matter sensing processing being a process for sensing whether a foreign matter is present between the electric power transmission portion and the electric power reception portion,
   the controller being configured to
      select an alignment prioritized mode in which the alignment processing is performed in preference to the foreign matter sensing processing before start of electric power transmission from the electric power transmission portion to the electric power reception portion, and
      select a foreign matter sensing; prioritized mode in which the foreign matter sensing processing is performed in preference to the alignment processing during electric power transmission from the electric power transmission portion to the electric power reception portion.

2. The electric power transmission apparatus according to claim 1, wherein
   in the alignment prioritized mode, the controller is configured to perform the alignment processing and the foreign matter sensing processing such that the number of times of the alignment processing performed within a first prescribed time period is greater than the number of times of the foreign matter sensing processing performed within the first prescribed time period, and
   in the foreign matter sensing prioritized mode, the controller is configured to perform the alignment processing and the foreign matter sensing processing such that the number of times of the foreign matter sensing processing performed within a second prescribed time period is greater than the number of times of the alignment processing performed within the second prescribed time period.

3. The electric power transmission apparatus according to claim 1, wherein
   in the alignment prioritized mode, the controller is configured to perform the alignment processing and the foreign matter sensing processing such that a time period of the alignment processing performed within a first prescribed time period is longer than a time period of the foreign matter sensing processing, performed within the first prescribed time period, and in the foreign matter sensing prioritized mode, the controller is configured to perform the alignment processing and the foreign matter sensing processing such that a time period of the foreign matter sensing processing performed within a second prescribed time period is longer than a time period of the alignment processing performed within the second prescribed time period.

4. The electric power transmission apparatus according to claim 1, wherein the electric power reception apparatus is mounted on a vehicle, and the controller is configured to select the alignment prioritized mode during movement of the vehicle before start of electric power transmission from the electric power transmission portion to the electric power reception portion.

5. The electric power transmission apparatus according to claim 1, wherein the electric power reception apparatus is mounted on a vehicle, the electric power transmission apparatus further includes a communication apparatus which communicates with the vehicle, and the controller is configured to select the alignment prioritized mode when communication with the vehicle is established by the communication apparatus before start of electric power transmission from the electric power transmission portion to the electric power reception portion.

6. The electric power transmission apparatus according to claim 1, wherein in the foreign matter sensing prioritized mode, the controller is configured to alternately perform the foreign matter sensing processing and the alignment processing with the foreign matter sensing processing being performed in preference to the alignment processing.

7. An electric power transmission system comprising:

the electric power transmission apparatus according to claim 1; and the electric power reception apparatus which wirelessly receives electric power from the electric power transmission apparatus.

* * * * *

UNITED STATES PATENT AND TRADEMARK OFFICE
CERTIFICATE OF CORRECTION

PATENT NO. : 10,744,882 B2
APPLICATION NO. : 16/030254
DATED : August 18, 2020
INVENTOR(S) : Toshiya Hashimoto, Takahiro Misawa and Hideo Nagata It is certified that error appears in the above-identified patent and that said Letters Patent is hereby corrected as shown below:

On the Title Page

Item (72), inventor 1, city, delete "Miyoshi" and insert --Miyoshi-shi Aichi-ken--, therefor.

Item (72), inventor 2, city, delete "Okazaki" and insert --Okazaki-shi Aichi-ken--, therefor.

Item (72), inventor 3, city, delete "Toyota" and insert --Toyota-shi Aichi-ken--, therefor.

In the Specification

In Column 1, Line(s) 59, after "alignment", delete ",".

In Column 1, Line(s) 61, after "alignment", insert --,--.

In Column 2, Line(s) 29, after "sensing", delete ",".

In Column 4, Line(s) 1, after "showing", delete ",".

In Column 5, Line(s) 35, delete "tamed" and insert --turned--, therefor.

In Column 5, Line(s) 43, after "processing", delete ",".

In Column 6, Line(s) 60, after "lens", delete ",".

In Column 6, Line(s) 66, after "direction", delete ",".

In Column 7, Line(s) 51, after "foreign", delete ",".

In Column 8, Line(s) 7, after "circuit", delete ",".

Signed and Sealed this
Twenty-ninth Day of December, 2020

Andrei Iancu
*Director of the United States Patent and Trademark Office*

CERTIFICATE OF CORRECTION (continued)
U.S. Pat. No. 10,744,882 B2

In Column 8, Line(s) 12, delete "ease" and insert --case--, therefor.

In Column 8, Line(s) 29, delete "ease" and insert --case--, therefor.

In Column 9, Line(s) 5, delete "340" and insert --140--, therefor.

In Column 9, Line(s) 5 & 6, delete "transmit, information," and insert --transmit information--, therefor.

In Column 9, Line(s) 6, after "electric", delete ",".

In Column 9, Line(s) 57, after "transmission", delete ",".

In Column 10, Line(s) 50, after "embodiment", insert --,--.

In Column 10, Line(s) 60, after "processing", delete ",".

In Column 11, Line(s) 7, after "using", delete ";".

In Column 11, Line(s) 27, after "sensing", delete ",".

In Column 11, Line(s) 48, delete "understanding, that," and insert --understanding that--, therefor.

In the Claims

In Column 14, Line(s) 40, Claim 1, after "sensing", delete ";".

In Column 15, Line(s) 3, Claim 3, after "processing", delete ",".